(12) United States Patent
Shih et al.

(10) Patent No.: US 7,785,527 B1
(45) Date of Patent: Aug. 31, 2010

(54) METHOD OF MAKING MIXED METAL OXIDE CERAMICS

(75) Inventors: Wei-Heng Shih, Bryn Mawr, PA (US); Huiming Gu, Holmes, PA (US); Wan Y. Shih, Bryn Mawr, PA (US)

(73) Assignee: Drexel University, Philadelphia, PA (US)

( * ) Notice: Subject to any disclaimer, the term of this patent is extended or adjusted under 35 U.S.C. 154(b) by 768 days.

(21) Appl. No.: 10/981,985

(22) Filed: Nov. 5, 2004

Related U.S. Application Data

(60) Provisional application No. 60/517,783, filed on Nov. 6, 2003.

(51) Int. Cl.
    *B28B 1/00*     (2006.01)

(52) U.S. Cl. .................................. 264/681; 264/603

(58) Field of Classification Search ................ 264/603, 264/681
    See application file for complete search history.

(56) References Cited

U.S. PATENT DOCUMENTS

| | | | |
|---|---|---|---|
| 4,801,435 A | 1/1989 | Tylko | |
| 4,847,466 A | 7/1989 | Pasquini et al. | |
| 5,079,199 A | 1/1992 | Ochi et al. | |
| 5,288,474 A * | 2/1994 | Reichert et al. | 423/594.8 |
| 5,486,269 A | 1/1996 | Nilsson | |
| 5,762,009 A | 6/1998 | Garrison et al. | |
| 5,774,633 A | 6/1998 | Baba | |
| 5,795,537 A * | 8/1998 | Senna et al. | 264/621 |
| 5,847,353 A | 12/1998 | Titus et al. | |
| 5,887,554 A | 3/1999 | Cohn et al. | |
| 5,993,761 A | 11/1999 | Czernichowski et al. | |
| 6,007,742 A | 12/1999 | Czernichowski et al. | |
| 6,169,049 B1 * | 1/2001 | Witham et al. | 501/137 |
| 6,245,309 B1 | 6/2001 | Etievant et al. | |
| 6,322,757 B1 | 11/2001 | Cohn et al. | |
| 6,363,716 B1 | 4/2002 | Balko et al. | |
| 6,408,227 B1 | 6/2002 | Singhvi | |
| 6,482,368 B2 | 11/2002 | Hemingway et al. | |
| 6,535,795 B1 | 3/2003 | Schroeder et al. | |
| 6,620,752 B2 * | 9/2003 | Messing et al. | 501/136 |
| 6,627,104 B1 * | 9/2003 | Wang et al. | 252/62.9 PZ |
| 2010/0003522 A1 * | 1/2010 | Zhong et al. | 428/407 |

OTHER PUBLICATIONS

Huiming et al., Single-Calcination Synthesis of Pyrochlore-Free 0.9Pb(Mg1/3 Nb2/3)O3-0.1PbTiO3 and Pb (Mg1/3Nb2/3)O3 Ceramics Using a Coating Method; J. Am. Ceram. Soc., 86 [2] 217-21 (2003).

(Continued)

*Primary Examiner*—Steven P Griffin
*Assistant Examiner*—Russell J Kemmerle, III
(74) *Attorney, Agent, or Firm*—Knoble Yoshida & Dunleavy, LLC

(57) ABSTRACT

A method of making dielectric ceramics containing mixed metal oxides is provided. The method comprises the steps of at least partially coating a metal oxide powder with a metal hydroxide or metal oxide, compacting the coated powder with one or more additional metal compounds or metal compound precursors, and directly sintering the compact in a single step. The method of the invention may be used to avoid occurrence of significant quantities of one or more undesired but thermodynamically or kinetically favored side products. The method of the invention may also be used to synthesize perovskites, in particular lead-magnesium-niobium (PMN), lead-magnesium-niobium-lead-titanium (PMN-PT) perovskites, or lead zirconate titanate (PZT).

21 Claims, 4 Drawing Sheets

OTHER PUBLICATIONS

Narendar, et al., "Kinetic Analysis of Combustion Synthesis of Lead Magnesium Niobate from Metal Carboxylate Gels", J. Am. Ceram. Soc., 80 (4), pp. 915-924, 1997.

Chaput, et al., "Low-Temperature Route to Lead Magnesium Niobate", J. Am. Ceram. Soc., 72 (8), pp. 1335-1357, 1989.

Han, et al., "New Preparation Method of Low-Temperature-Sinterable Perovskite 0.9Pb(Mg1/3Nb2/3) 03-0.1PbTiO3 Powder and its Dielectric Properties", J. Am. Ceram. Soc., 81(11), pp. 2998-3000, 1998.

Ravindranathan, et al., "Synthesis and Dielectric Properties of Solution Sol-Gel-Derived 0.9Pb(Mg1/3Nb2/3) 03-0.1PbTiO3 Ceramics", J. Am. Ceram. Soc., 74 (12), pp. 2996-2999, 1991.

Baek, et al., "Sythesis of Pyrochlore-Free 0.9Pb(Mg1/3Nb2/3)03-0.1PbTiO3 Ceramics via a Soft Mechanochemical Route", J. Am. Ceram. Soc., 80 (4), pp. 973-981, 1997.

Gu, et al., "Study of Mechanism of Pyrochlore-Free PMN-PT Powder Using a Coating Method", Ceramic Transactials, 152, pp. 55-64, 2004.

* cited by examiner

Figure 3a
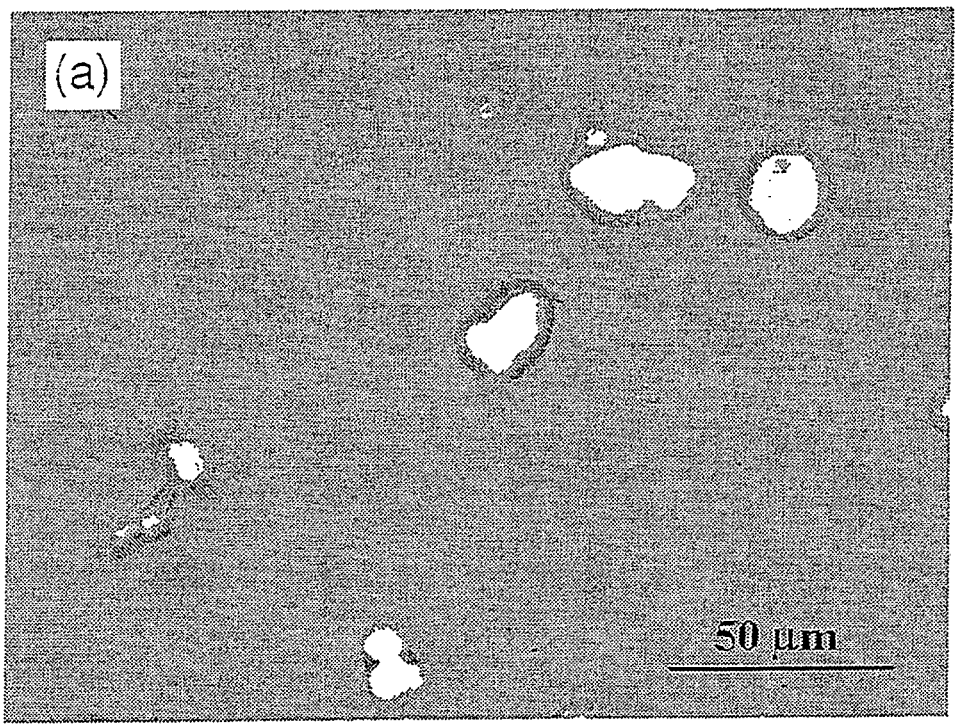
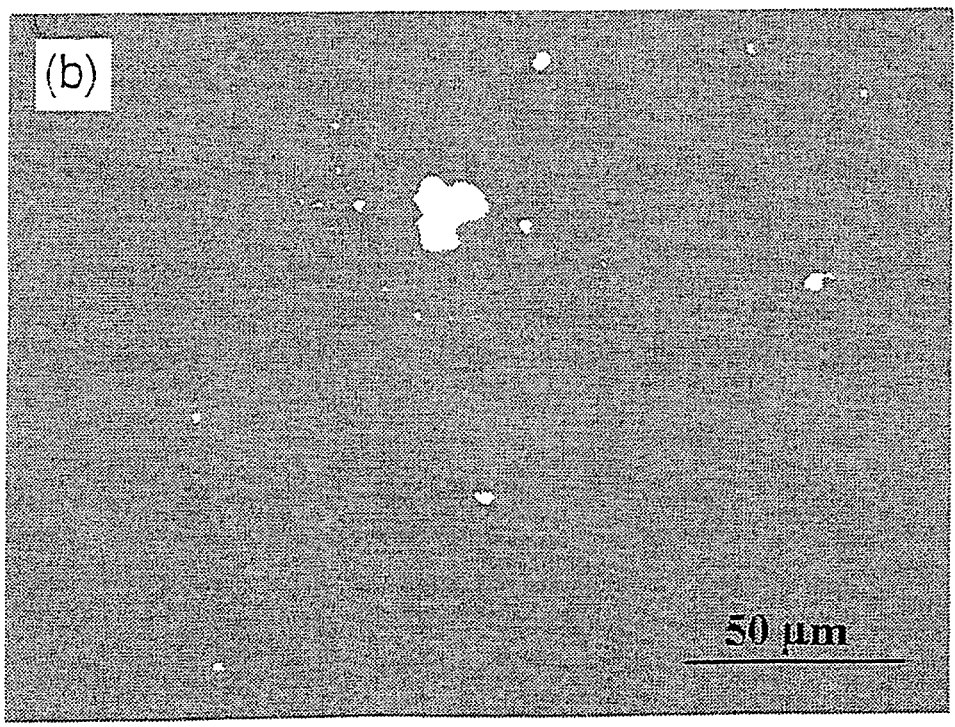
Figure 3b

METHOD OF MAKING MIXED METAL OXIDE CERAMICS

CROSS-REFERENCE TO RELATED APPLICATIONS

This application claims the benefit, under 35 U.S.C. §119(e) of U.S. Provisional patent application No. 60/517,783, filed on Nov. 6, 2003.

BACKGROUND OF THE INVENTION

1. Field of the Invention

The present invention relates to the field of solid-state chemistry, and, specifically, to the synthesis of mixed metal oxide ceramics, including perovskites.

2. Description of the Related Technology

Relaxor lead magnesium niobate $Pb(Mg_{1/3}Nb_{2/3})O_3$ (PMN) has been studied extensively because of its high dielectric constant and large electrostrictive coefficients. For example, $0.9PMN-0.1PT(PbTiO_3)$ relaxor ferroelectric is a good candidate for multi-layer ceramic capacitor applications due to its high dielectric constant at room temperature. A 0.65PMN-0.35PT solid solution is a good piezoelectric material for sensor and actuator applications. However single-phase perovskite PMN could not be obtained by the conventional solid oxide method because of the presence of the pyrochlore phase, a reaction product between $Nb_2O_5$ and PbO. Swartz and Shrout first succeeded in eliminating the pyrochlore phase by developing the columbite method that involved two calcination steps:

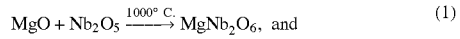
(1)

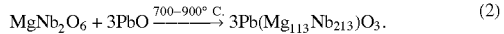
(2)

In the first calcination step, mixtures of $Nb_2O_5$ and MgO were heated near 1000° C. to form the columbite phase, $MgNb_2O_6$. In the second calcination step, $MgNb_2O_6$ was mixed with PbO and heat-treated. The perovskite phase began to appear near 700° C. and complete perovskite conversion occurred near 900° C. The two calcination temperatures may vary with a number of parameters such as reactivity of MgO, degree of mixing, and control of the PbO volatility. Nevertheless, two calcination steps were needed to prevent the direct contact between $Nb_2O_5$ and PbO and, thus, the formation of the pyrochlore.

Other methods including sol-gel methods solution processes, soft mechanochemical pulverization, co-precipitation, thermal spray, and $Mg(NO_3)_2$ mixing have also been developed to prepare pyrochlore-free PMN-PT powders. These methods were based on the principle of improving the reactivity of MgO either by optimizing the powder characteristics including particle size, specific surface area, reactivity of raw materials such as $Mg(OH)_2$ or $Mg(NO_3)_2$, or by using a high-energy milling method. A molten salt method has also been shown to produce single-phase perovskite PMN-PT powders. Of all the available methods, the columbite method is still the most widely used method in preparing lead-based relaxor ferroelectrics because of its less stringent requirements on the raw materials and the high reliability of the process. However, the columbite method requires two calcination steps, i.e., the formation of the columbite phase at around 1000° C. followed by the complete formation of the perovskite phase at 900° C.

Because of the presence of pyrochlore phase, PMN ceramics are sintered using perovskite PMN powders. The regular sintering temperature of PMN ceramics is around 1200° C. At this temperature, the lead loss is serious. This results in an imprecise composition and deterioration of the final properties. In addition, with such a high sintering temperature low-cost electrodes such as Ag and Cu cannot be used to produce multi-layer capacitors and multi-layer actuators.

Another disadvantage of the traditional columbite method is the requirement of multiple processing steps. The traditional columbite method requires three ball milling steps, two calcination steps and one sintering step to obtain the final PMN ceramics. A process employing all of these steps is cost-prohibitive.

Although PMN-PT solid solutions possesses the best properties among its class, the commonly used technology for making PMN-PT solid solutions requires multiple heat treatment steps and a temperature of 1200° C. for the final sintering step. The cost associated with the multiple processing steps and the cost of special electrode materials that can sustain the high sintering temperature make PMN-PT solutions uncompetitive in important applications such as for multi-layer capacitors and multi-layer actuators. Some methods were found to permit lower sintering temperatures. For example, by adding 5-21 wt % excess of PbO, the sintering temperature can be reduced to 950° C. Adding 1-4 at % of SrO permits use of a sintering temperature as low as 800° C.-900° C. Use of PMN powder made by the $Mg(NO_3)_2$ mixing method, allows the sintering temperature to be reduced to 900° C. These methods, however, only permit lowering of the sintering temperature, but they still require multiple processing steps that result in a prohibitively high production cost.

By directly compacting the columbite phase and PbO into a green-body and sintering, the columbite method could be reduced to requiring two ball milling steps, one calcinations step, and one sintering step. However, the sintering temperature had to be increased to 1250° C. Later, with the same method, the sintering temperature was able to be reduced to 1000° C. by sintering a mixture of very fine $TiO_2$ powder with more reactive $(PbCO_3)_2Pb(OH)_2$ in an $O_2$ atmosphere. Although this method had the advantages that it required fewer processing steps than the columbite method, and that it lowered the sintering temperature to 1000° C., this process still required two ball-milling steps, one calcination step and one sintering step. In addition, this method suffers from the additional disadvantages that there are additional costs associated with the fabrication of the required nanosize $TiO_2$ powder and for the provision of the $O_2$ sintering atmosphere, which still makes this method cost-prohibitive.

U.S. Pat. No. 5,079,199 (Ochi et al.) proposes to solve the problem of liquid $Pb_2WO_5$ formation during the production of lead magnesium tungstate by first reacting MgO with $WO_3$ to form $MgWO_4$, mixing, pressing and reacting with PbO to form the desired product. In this manner, liquid $Pb_2WO_5$ formation is prevented. Ochi et al. filters, dries and reacts the mixture of MgO with $WO_3$ at 750-1000° C. to form magnesium tungstate powder. Mixtures of the magnesium tungstate powder were made with PbO, NiO, $Nb_2O_5$, MgO and $TiO_2$ in a ball mill. Each mixture was then filtered, dried, and calcined at 750-850° C., a disk was made and the disk was sintered in air at 925-1050° C. for one hour. Ochi et al. also mentions that a similar process can be employed for the manufacture of ceramic compositions containing as the main component, one or more perovskite compounds such as lead magnesium niobate.

In summary, each of these methods either reduced the complexity of the columbite process or reduced the required sintering temperature. However, none of these methods solved both the cost problem and the problem that sintering must be carried out at a high sintering temperature.

Therefore, there remains a need for an improved and cost effective method for making perovskites, as well as other mixed metal oxide ceramics in order to make these materials competitive in the market place. Although the above methods address certain aspects of making perovskites, none have managed to create a truly cost effective method of making perovskites. Applicants have managed to create such a method by transforming the pyrochlore phase commonly found in perovskite production. In transforming this phase Applicants have been able to reduce the production of perovskite to a single-step, low temperature reactive sintering method. This method is also broadly applicable to the synthesis of other mixed metal oxide ceramics and need not be used solely for perovskites.

SUMMARY OF THE INVENTION

Accordingly, it is an object of certain embodiments of the invention to provide a low-temperature reactive sintering method for the production of ceramics containing mixed metal oxides.

According to a first aspect of the invention, a method of making a ceramic composition comprising a mixed metal compound is disclosed. The method has a step (a) of at least partially coating a metal oxide powder comprising a first metal, with a compound selected from the group consisting of metal hydroxides and metal oxides comprising a second metal to form an at least partially coated metal oxide powder. The method also has a step (b) of compacting the at least partially coated metal oxide powder with one or more coating compounds selected from the group consisting of metal compounds and metal compound precursors, to form a body, the metal compounds and metal compound precursors containing a third metal. The method also has the step of heating the body from step (b) to form a ceramic composition comprising a mixed metal compound.

These and other objects of the present invention will be apparent from the summary and detailed descriptions of the invention, which follow.

BRIEF DESCRIPTION OF THE DRAWINGS

FIG. 3a shows an optical micrograph of the coated $Nb_2O_5$ particles.

FIG. 3b shows an optical micrograph of uncoated $Nb_2O_5$ particles.

DETAILED DESCRIPTION OF THE PREFERRED EMBODIMENTS

Figure 1:
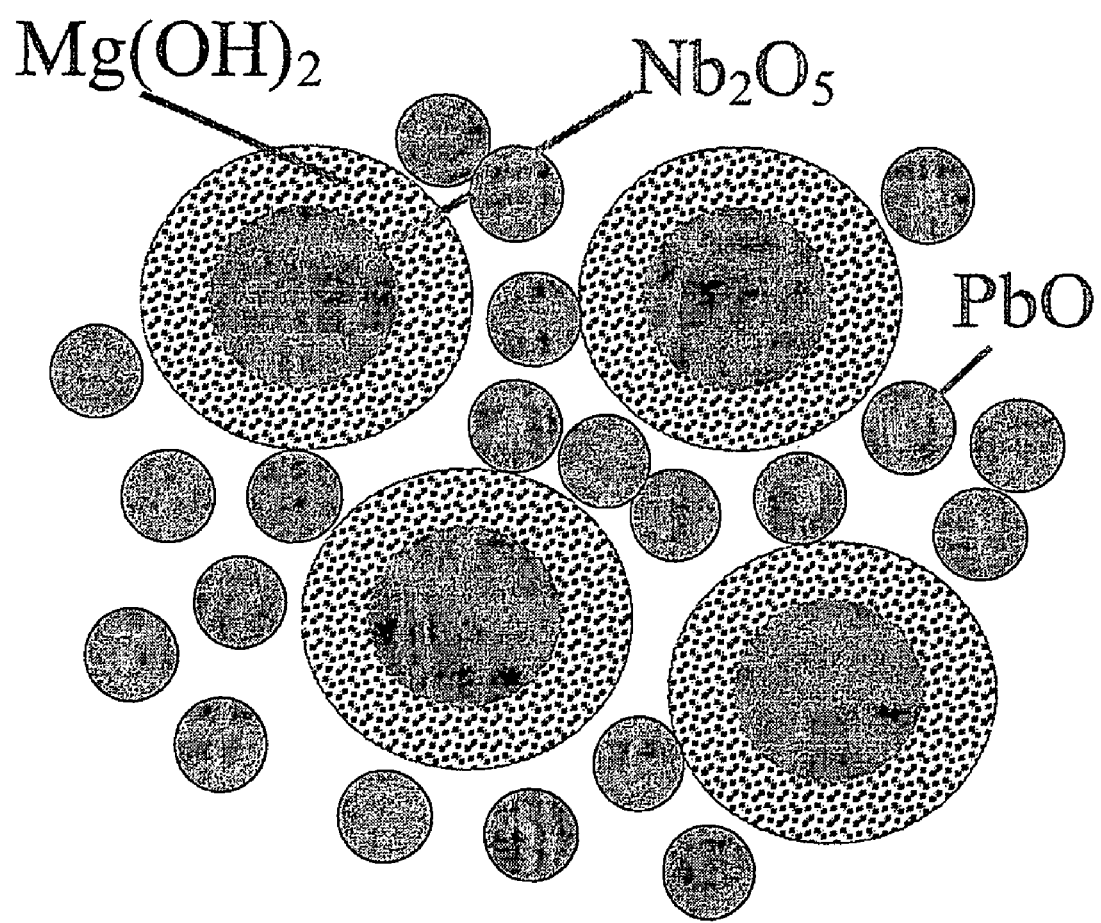
FIG. 1 is a schematic of $Mg(OH)_2$ coated $Nb_2O_5$ particles mixed with PbO particles.

The term "mixed metal compound" as used herein refers to single-phase materials comprising cations of two or more metallic elements.

The term "binary metal oxide" as used herein refers to single-phase materials comprising oxygen anions and cations of two metallic elements. Analogously, the terms "ternary metal oxide" and "quaternary metal oxide" refer to single-phase materials comprising oxygen anions and cations of three or four metallic elements, respectively.

The term "metal" as used herein, alone or in combined form, e.g., metallic or metallo-, refers to elements that can form cations in aqueous solution.

In a first embodiment of the present invention, a method of synthesizing mixed metal oxide ceramics is provided. In general, the method requires contacting a metal-oxide powder with a metal hydroxide or oxide to form a mixed metal powder. In a preferred embodiment, the metal oxide powder is at least partially coated with a metal hydroxide or metal oxide layer during the contacting step. In the preferred embodiment it is a metal hydroxide, however it is possible to coat with another metal compound, such as a metal oxide. The product of the contacting step is then mixed with one or more metal compounds or metal compound precursors to produce a mixed metal oxide powder. This powder may then be pressed and sintered to form a ceramic containing a mixed metal oxide.

While not wishing to be bound by any particular theory, it is thought that the present approach provides at least a partial coating of the metal oxide powder precursor with the metal hydroxide or metal oxide. This reduces or prevents contact between the first metal compound and the second metal compound or second metal compound precursor to thereby reduce or substantially prevent the formation of undesirable products during the sintering step. Also, the provision of at least a partial coating on the metal compound starting material is found to enhance mixing between the reacted pyrochlore phase and the metal oxide by increasing the surface contact between them, thereby causing the perovskite transformation temperature to overlap with the sintering temperature during the sintering step used to produce a green body or ceramic. In addition, the partial coating appears to result in smaller particles during the reaction, which promotes sintering at lower temperatures.

The method can be applied, for example, to the production of lead magnesium niobate $Pb(Mg_{1/3}Nb_{2/3})O_3$ (hereinafter "PMN"). In this method, low temperature processing of PMN can be achieved by virtue of the at least partial coating of $Nb_2O_5$ powder with $Mg(OH)_2$. The present method is based on the principle of the overlap of the perovskite formation temperature due to the intimate mixing of reaction ingredients and the lowered sintering temperature due to the smaller particle size of reacted phase. However, unlike the columbite method, only one final sintering step is needed in the present method. The at least partial coating of $Mg(OH)_2$ on $Nb_2O_5$ is believed to increase the intimate mixing of the reacted pyrochlore phase with MgO, and, thus, this causes the perovskite formation temperature to overlap with the sintering temperature significantly. Furthermore, the mixing of the at least partial coating of $Mg(OH)_2$ on $Nb_2O_5$ and PbO reduces the required reaction temperature and results in smaller pyrochlore particles, which promotes sintering at lower temperatures.

In a preferred embodiment $Mg(OH)_2$ is used as the coating material, however it is possible that another metal hydroxide, or metal oxide could be used in its place, such as, AlOOH, $SiO_2$, $TiO_2$, $Ti(OH)_4$, ZnO, $Zn(OH)_2$, $ZrO_2$ and $Zr(OH)_4$. Also, the starting reactant for the method need not be limited to PbO, but may also include other metal compounds such as $3Pb(NO_3)_2 7PbO$, $Pb(NO_3)_2$, $PbCO_3$, $(PbCO_3)_2 Pb(OH)_2$ and $Pb(OH)_2$.

A method for the at least partial coating of $Nb_2O_5$ with $Mg(OH)_2$ is described in the article, "Single-Calcination Synthesis of Pyrochlore-Free 0.9 $Pb(Mg_{1/3}Nb_{2/3})O_3$-0.1$PbTiO_3$ and $Pb(Mg_{1/3}Nb_{2/3})O_3$ Ceramics Using a Coating Method,"

Huiming Gu, Wan Y. Shih and Wei-Heng Shih, *J. Am. Ceram. Soc.*, 86 [2] 217-221 (2003), the disclosure of which is hereby incorporated by reference.

More specifically, to provide at least a partial coating, $Mg(NO_3)_2 6H_2O$ may be dissolved in water followed by the addition of $Nb_2O_5$ powder to the solution. The mixture may then be treated to break up the $Nb_2O_5$ agglomerates and a hydroxide can be added to the mixture until the pH exceeds about 8.9, and more preferably, until the pH is in the range of 9-11, and most preferably, the pH is in the range of 9.5-10.5. The mixture may then be stirred for a sufficient time to form $Mg(OH)_2$ in situ and precipitate $Mg(OH)_2$ on the surface of the $Nb_2O_5$ to thereby provide an at least partially coated $Nb_2O_5$ powder product. The $Mg(OH)_2$ does not have to be formed in situ, but rather, can be directly introduced to the reaction, as long as it can be coated on the surface of $Nb_2O_5$. Typically, reaction times of 10 minutes to 2 hours are required for the precipitation reaction, and more preferably, the precipitation reaction takes about 15 minutes to 1 hour. The reaction may be allowed to proceed to provide substantially complete coating of the $Nb_2O_5$ powder product.

Preferably, the Mg-containing precursor and the Nb containing precursor are used in amounts that provide approximately equimolar amounts of Mg and Nb. For example, the molar ratio of Mg to Nb in the reaction mixture is preferably from about 0.8-1.2, and more preferably from about 0.9-1.1.

The suspension of at least partially coated $Nb_2O_5$ powder may then be mixed with, for example, a suspension of PbO, or a suspension of a mixture of PbO and $PbTiO_3$, which is prepared by mixing distilled water, PbO and $PbTiO_3$ in the amounts required to give the desired ratio of PbO to $PbTiO_3$. The mixture of the two suspensions may then be stirred to provide a substantially homogenous mixture and dried to provide a powder. The dried powder may then be compacted and sintered to produce a ceramic containing PMN in a substantially pure perovskite phase. The method of the present invention results in a substantially pure perovskite phase with only one sintering step, as schematically illustrated in FIG. 1.

Figure 2:
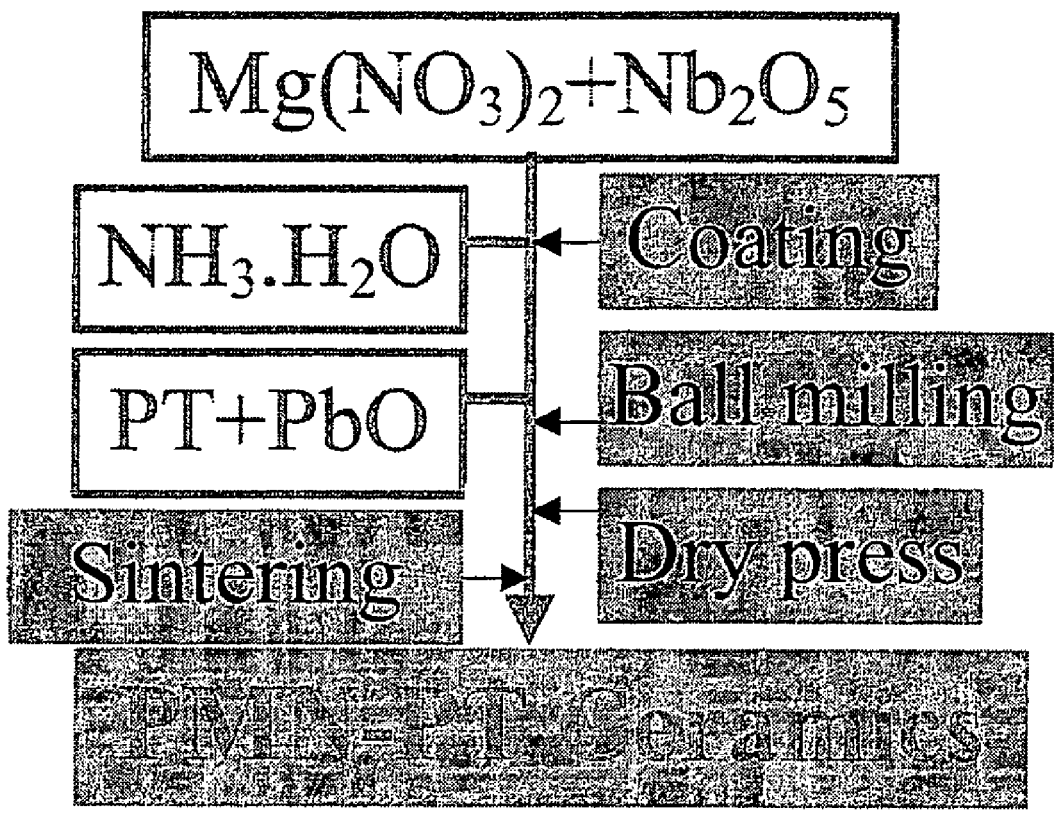
FIG. 2 is a flow chart depicting the method.

As shown in FIG. 2, by compacting a mixture of $Nb_2O_5$ at least partially coated with $Mg(OH)_2$ and PbO, or a mixture of PbO and $PbTiO_3$ powders into a green body, and performing a single heat treatment at 1000° C. for 2 hours, 0.9PMN-0.1PT ceramics of 94% theoretical density, with good dielectric properties are produced.

This method provides dense perovskite phase PMN-PT ceramics by sintering the compacts in a single heat treatment step. The powder mixture is preferably ball milled for mixing and compacting. Compacting is preferably carried out as a dry compacting step, although it may optionally be carried out in the presence of a conventional granulating fluid, such as polyvinyl alcohol. The dried compact is heated at 3° C./min to 500° C. and held for 1-3 hours. The compact is then heated to a temperature of from about 800° C. to about 1100° C. at 5° C./min and held there for about 1-3 hours. More preferably, the compact is heated to a temperature of from about 900° C. to about 1050° C. and held there for about 1.5-2.5 hours. Most preferably, the compact is heated to a temperature of about 1000° C. for a period of about 2 hours. The above steps can be performed with all (1−x)PMN-xPT solid solutions, with x varying from 0 to 1. The exact times and temperatures for the heating step may vary depending on the composition the compact.

As shown in FIG. 3, at T<500° C. there is no reaction and no major density or particle size change. At temperatures of 500° C.-800° C. a pyrochlore phase is formed, this results in volume expansion and the particle size decreases. At temperatures of 800° C.-1000° C., the pyrochlore phase transforms to a perovskite phase and significant density and grain size increases are observed. Equal or larger than stoichiometric PbO content in the reaction mixture is required to obtain the grain size and density increases. Stoichiometric amounts of PbO will result in the best dielectric properties in the products. The grain size increases with increasing PbO content and saturates at 102% of PbO. Density peaks at 102% of PbO. Excess PbO beyond 102% is not harmful but may be undesirable from an economic standpoint.

The method produces a smaller pyrochlore phase and smaller MgO particles than the conventional columbite method. The powders are more homogeneously mixed by the reaction of the at least partially coated particles with the PbO particles.

The clear advantages of the present method are that it requires only one ball milling step and one sintering step at 1000° C., 200° C. lower than the traditional columbite method, and there are no special requirements for the raw materials and equipment. The lower sintering temperature even allows the use of less expensive metals for the electrodes than would be required for the conventional columbite process, and the simple streamlined process will provide dramatically lower costs, making this superior material economically competitive for many dielectric and piezoelectric applications including multi-layer capacitors and multi-layer actuators.

The preferred embodiment is disclosed above, but this method can be used for other combinations of materials, and is broadly applicable to the synthesis of mixed metal compounds in general. For example, at least partially coating metal compound particles with a metal hydroxide or oxide layer, and then sintering the particles, optionally together with other precursors, can produce other mixed metal compounds in an economically attractive process. The method is particularly effective for the synthesis of perovskites in systems that suffer from the problem of pyrochlore formation during sintering, similar to the of lead magnesium niobate (PMN) system described above.

Other perovskite systems that can be benefited by the method of the present invention, for example, are, lead magnesium tantalite, lead nickel niobate, lead scandium tantalite, barium titanate and lead indium niobate. The times and temperatures of the heating step may vary for these systems depending on the composition of the compact treated in the heating step.

The method can also be beneficial to the production of perovskites using sintering processes which do not suffer from the problem of pyrochlore formation since this direct sintering approach can potentially lower the sintering temperature of the system due to the more reactive nature of the at least partially coated metal oxide powders employed as a reactant in the process. For example, direct sintering of lead zirconate titanate (PZT) has been achieved by this method.

The following examples are provided to describe the invention in further detail. These examples, which set forth a preferred mode presently contemplated for carrying out the invention, are intended to illustrate and not to limit the invention.

EXAMPLE 1

This example demonstrates one step in the preferred embodiment of the instant invention that involves the creation of a coating of $Mg(OH)_2$ on $Nb_2O_5$.

Starting materials used in this preferred embodiment are $Nb_2O_5$ (99.9%), PbTiO3 (99+%), PbO (99.9+%), $Mg(NO_3)_2 \cdot 6H_2O$ (99%), and $NH_4OH$ (5.08 N). The 0.9PMN-0.1 PT and PMN precursors are prepared in the following manner. $Mg(NO_3)_2.6H_2O$ (0.105 mol) is dissolved in 500 mL of distilled water, followed by the addition of 0.1 mol of $Nb_2O_5$ powder to the solution. This mixture is denoted as suspension I.

Suspension I, is then stirred and ultrasonicated (50 MHz, 50 W) for 10 min. to break up the $Nb_2O_5$ agglomerates. At this point, the suspension pH will be between 5 and 6. For $Mg(OH)_2$ to precipitate on the $Nb_2O_5$ surface, $NH_4OH$ (5.08N) is added dropwise into the mixture until the pH reaches 10. The mixture is then stirred for 30 minutes.

The surface of $Nb_2O_5$ is negatively charged at pH>6, and is attracted to the $Mg^{2+}$ ions. This promotes the precipitation of $Mg(OH)_2$ on the $Nb_2O_5$, making the coating of $Mg(OH)_2$ on $Nb_2O_5$ possible. This procedure performed in the preferred embodiment will produce a coating of $Mg(OH)_2$ on $Nb_2O_5$. This coating is advantageous in making the powders more reactive and transforming the pyrochlore phase into perovskites. The formation of the coating can also be advantageous in preventing other reagents from reacting with one another in different metal compound systems.

EXAMPLE 2

This example demonstrates the direct sintering process of the present invention.

First, the product of Example 1 is mixed with a suspension of PbO and $PbTiO_3$, which is denoted as suspension II. Suspension II is prepared by mixing 200 mL of distilled water with 0.303 mol of PbO and an appropriate amount of $PbTiO_3$, depending on the desired composition of the PMN-PT solid solution. Suspension II is ultrasonicated for 10 minutes before it is added to the product of Example 1. The mixture then is stirred for 60 minutes and dried by rotary evaporation. The dried powders are ball-milled in isopropyl alcohol for 20 hours and rotary evaporated. It is to be understood that although ball-milling is used in the example provided, alternative methods are available which can be used in the present invention, such as, high-energy ball-milling, Jet Pulverizers, and Pulverizing Mills.

The mixture of $Mg(OH)_2$-coated $Nb_2O_5$, PbO and $PbTiO_3$ powders is then used to create a green body. This green body is created by pressing the powders at 200 MPa into pellets 1 mm thick and 25 mm in diameter.

The green body is then used in the sintering process. The dried compact is heated at 3° C./min to 500° C. and held for 2 hr. The sample is then heated to 1000° C. at 5° C./min and held there for 2 hr. This process produces a dielectric ceramic containing 0.9PMN-0.1PT and having a 93.6% theoretical density, with good dielectric properties.

The process disclosed in the example is more efficient than previous methods. Furthermore, the process set forth in this example can be made applicable to other mixtures.

EXAMPLE 3

An optical micrograph of the coated $Nb_2O_5$ particles is shown in FIG. 3a with the light colored $Nb_2O_5$ particles surrounded by dark-colored coating layers. For comparison, an optical micrograph of uncoated $Nb_2O_5$ particles is shown in FIG. 3b to confirm that uncoated $Nb_2O_5$ particles appear as light-colored particles. The dark-colored coating layer was shown to be $Mg(OH)_2$ by precipitating a powder of $Mg(OH)_2$ under the same precipitation conditions used to provide the coating, except in the absence of $Nb_2O_5$ particles.

EXAMPLE 4 AND COMPARATIVE EXAMPLES A-E

Figure 4:
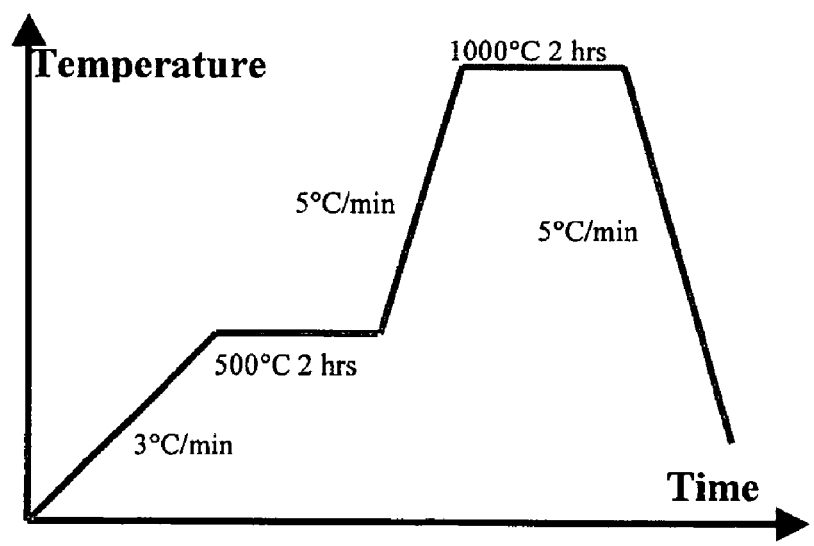
FIG. 4 shows a graph of the reaction route of the method used in Examples 1 and 2.
Figure 5:
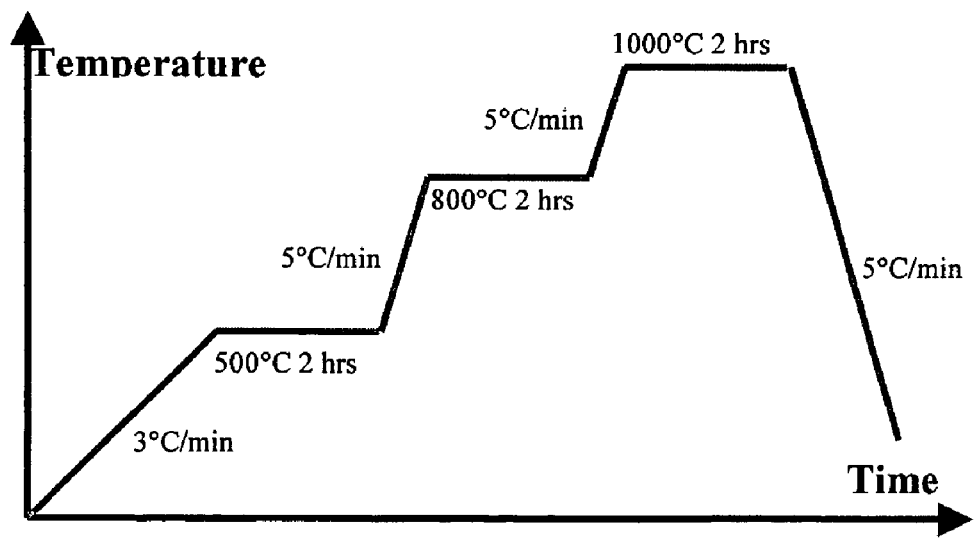
FIG. 5 show a graph the separated reaction and sintering route.

The method of the present invention, as set forth in Examples 1-2 above was performed to produce a ceramic dielectric material comprising 0.9 $Pb(Mg_{1/3}Nb_{2/3})O_3$-0.1$PbTiO_3$, with sintering using the "regular route" shown in FIG. 4. In comparative example A, the conventional columbite route described above, was employed using the separated reaction and sintering route shown below to produce a ceramic dielectric material comprising 0.9 $Pb(Mg_{1/3}Nb_{2/3})O_3$-0.1$PbTiO_3$. In comparative example B, the conventional columbite route was employed except that instead of separate reaction (calcining) and sintering steps, the materials were directly sintered in a single step using the regular route shown below to produce a ceramic dielectric material comprising 0.9 $Pb(Mg_{1/3}Nb_{2/3})O_3$-0.1$PbTiO_3$. In comparative example C, the reactive columbite method of Y. C. Liou, L. Wu, and S. S. Liou, *Jpn. J. Appl. Phys.*, Vol. 33, Pt. 2, No. 9B (1994) was employed to produce a ceramic dielectric material comprising 0.9 $Pb(Mg_{1/3}Nb_{2/3})O_3$-0.1$PbTiO_3$. In comparative example D, a modified version of the reactive columbite method as described in S. Kwon, E. M. Sabolsky, G. L. Messing, *J. Am. Ceram. Soc.*, 84[3]648-650 (2001) was employed to produce a ceramic dielectric material comprising 0.9 $Pb(Mg_{1/3}Nb_{2/3})O_3$-0.1$PbTiO_3$. In comparative example E, the coating method of the present invention was employed together with the separated reaction and sintering route shown in FIG. 5 to produce a ceramic dielectric material comprising 0.9 $Pb(Mg_{1/3}Nb_{2/3})O_3$-0.1$PbTiO_3$. The results are shown in Table 1. The relative density was measured by the Archimedes method in kerosene.

TABLE 1

| Example | Relative Density (%) |
| --- | --- |
| Example 4 | 93.6 |
| Comparative Example A | 89.2 |
| Comparative Example B | 88.7 |
| Comparative Example C | 60.9 |
| Comparative Example D | 70.1 |
| Comparative Example E | 76.2 |

EXAMPLE 5

This example demonstrates one step in an embodiment of the instant invention that involves the creation of a coating of zirconium hydroxide on $TiO_2$ (53% zirconia and 47% titania) and the direct sintering of PZT in the present invention.

Two grams of titania were dissolved in distilled water. Once the titania was dissolved, an appropriate amount of zirconyl nitrate solution ($ZrO(NO_3)_2$ was added to the solution and dissolved. Raising the pH to approximately 10 by adding ammonium hydroxide precipitated the zirconia. The mixture was then stirred for two hours, centrifuged, and washed several times with distilled water. The powders were then dried overnight.

The resulting zirconia-titania powders were mixed with a suspension of PbO with 10% wt. excess. The additional PbO was added to compensate for lead loss during sintering. The mixed powders were ball-milled in a plastic jar having alcohol as the solvent and containing zirconia balls. After ball-milling, the resulting slurry was dried to evaporate as much alcohol as possible. The resulting materials of the evaporated slurry were then ground into powder and mixed with a three percent aqueous polyvinyl alcohol (PVA) solution, which was used as a binder. Large lumps were sieved and ground again until they passed through the sieve. Removing large chunks of powder ensured better powder packing during compaction.

The powder was then dry-pressed using a one-inch diameter circular die. Four grams of the powder was pressed to form green-bodies. The pressure of the press was increased steadily until it reached approximately 5000 kg force and was held there for about one to two minutes before being slowly unloaded. The green bodies were heat treated at 600° C. for two hours to burn off the PVA binder. Then the samples were heat treated to 1000° C. at a rate of 5° C./min and held there for one hour.

The process employed in the above example is more efficient than processes using simple mixtures of zirconia, titania, and lead oxide. Not only is the density of the samples higher, but also the dielectric constant of the samples is superior to that achieved when using simple mixtures.

It is to be understood that even though numerous characteristics and advantages of the present invention have been set forth in the foregoing description, together with details of the method, the disclosure is illustrative only, and changes may be made within the principles of the invention to the full extent indicated by the broad general meaning of the terms in which the appended claims are expressed.

What is claimed is:

1. A method of making a ceramic composition comprising a mixed metal compound, said method comprising the steps of:
   a. providing a coating on a metal oxide powder comprising a first metal, with a metal hydroxide compound to form a coated metal oxide powder;
   b. milling said coated metal oxide powder, wherein said coated metal oxide powder is formed prior to said milling step;
   c. compacting said coated metal oxide powder from step (b) with one or more compounds selected from the group consisting of metal compounds and metal compound precursors, to form a body, said metal compounds and metal compound precursors containing a second metal; and
   d. heating said body from step (c) to form a ceramic composition comprising a mixed metal compound.

2. The method of claim 1, wherein said coated metal oxide powder is compacted with said one or more compounds selected from the group consisting of metal compounds and metal compound precursors, without calcining a mixture of said coated metal oxide powder and said one or more compounds selected from the group consisting of metal compounds and metal compound precursors prior to said compacting step.

3. The method of claim 2, wherein the one or more compounds selected from the group consisting of metal compounds and metal compound precursors comprise PbO.

4. The method of claim 3, wherein the one or more compounds selected from the group consisting of metal compounds and metal compound precursors further comprise $PbTiO_3$.

5. The method of claim 1, wherein the ceramic composition comprises a perovskite phase of the mixed metal compound.

6. The method of claim 1, wherein the mixed metal compound comprises at least one mixed metal compound selected from the group consisting of a lead magnesium niobate, lead magnesium tantalite, lead nickel niobate, lead scandium tantalite, lead indium niobate, barium titanate and lead zirconate titanate.

7. The method of claim 6, wherein the mixed metal compound comprises lead magnesium niobate.

8. The method of claim 1, wherein the metal oxide powder is $Nb_2O_5$.

9. The method of claim 1, wherein the compound is $Mg(OH)_2$.

10. The method claim 1, wherein the heating step is carried out at a temperature of about 800° C. to about 1100° C.

11. The method of claim 1, wherein the ceramic composition is substantially free of a pyrochlore phase.

12. The method of claim 1, wherein said milling step comprises a ball milling step.

13. The method of claim 12, further comprising the step of drying the product of said ball milling step prior to said compacting step.

14. The method of claim 13, wherein the coating compound is a metal hydroxide that is formed in situ.

15. The method of claim 14, wherein the metal oxide powder comprises $Nb_2O_5$, the metal hydroxide comprises $Mg(OH)_2$, and the second metal is Pb.

16. The method of claim 1, wherein the said mixed metal compound comprises barium titanate.

17. The method of claim 1, wherein the compound of step (a) is a metal hydroxide.

18. The method of claim 1, wherein the step of coating the metal oxide powder comprises the steps of:
   (i) providing a composition comprising water, the metal oxide powder and said compound selected from the group consisting of metal hydroxides or a precursor thereof which forms a metal hydroxide coating;
   (ii) if the pH of the suspension is below a pH of 8.9, adjusting a pH of the suspension to a pH level exceeding 8.9; and
   (iii) forming said coating of said metal hydroxide on a surface of the metal oxide powder.

19. The method of claim 18, wherein the pH is adjusted to a pH of about 9 to about 11.

20. The method of claim 18, wherein the pH is adjusted to a pH of about 9.5 to about 10.5.

21. The method of claim 18, wherein the precursor of said metal hydroxide is dissolved in said water in step (i) and said metal hydroxide is precipitated from said solution in step (iii).

* * * * *